United States Patent [19]

Searby et al.

[11] Patent Number: 4,524,421
[45] Date of Patent: Jun. 18, 1985

[54] COMPUTERIZED GRAPHICS SYSTEM AND METHOD USING AN ELECTRONICALLY SYNTHESIZED PALETTE

[75] Inventors: Anthony D. Searby; Ian C. Walker, both of Newbury, England

[73] Assignee: Quantel Limited, Newbury, England

[21] Appl. No.: 360,732

[22] Filed: Mar. 22, 1982

[30] Foreign Application Priority Data

Mar. 11, 1982 [GB] United Kingdom ............... 8207084

[51] Int. Cl.³ .................. G06F 3/14; G06F 15/20; H04N 7/18
[52] U.S. Cl. ................... 364/521; 340/703; 340/706; 358/903; 364/526
[58] Field of Search ............. 364/521, 526, 200, 900; 206/1.7, 81; 358/75, 76, 81, 82, 93, 903; 340/703, 706

[56] References Cited

U.S. PATENT DOCUMENTS

| | | | |
|---|---|---|---|
| 1,360,085 | 11/1920 | Bradley | 206/81 X |
| 2,565,912 | 8/1951 | Davis | 206/1.7 |
| 3,192,315 | 6/1965 | Remley | 358/133 |
| 3,672,742 | 6/1972 | Barg | 206/1.7 X |
| 4,103,331 | 7/1978 | Thacker | 364/200 |
| 4,189,743 | 2/1980 | Schure et al. | 358/93 |
| 4,189,744 | 2/1980 | Stern | 358/93 |
| 4,200,867 | 4/1980 | Hill | 340/703 |
| 4,232,311 | 11/1980 | Agneta | 358/81 X |
| 4,250,522 | 2/1981 | Seki et al. | 358/76 |
| 4,318,096 | 3/1982 | Thornburg et al. | 340/706 |
| 4,329,710 | 5/1982 | Taylor | 358/81 |
| 4,418,390 | 11/1983 | Smith et al. | 364/526 |

FOREIGN PATENT DOCUMENTS 1579828 11/1980 United Kingdom ............... 206/1.7

Primary Examiner—Felix D. Gruber
Attorney, Agent, or Firm—Cooper, Dunham, Clark, Griffin & Moran

[57] ABSTRACT

The disclosed system and method allow an artist to blend a desired color from available source (i.e., menu) colors and use the resulting blend color at the desired part of the picture and/or store the blend color for future use as a source color. A palette mixing area and a menu of colors can be displayed on a video screen. A signal defining a selected source color is generated when the artist touches with a stylus an area on a touch tablet which corresponds to the screen display of the selected color. When the stylus then touches the part of the touch tablet corresponding to a selected part of the palette mixing area on the screen, the screen shows at that selected area a blend of any color preexisting there and the selected color. A signal defining the blend color can be stored for future use as a source color. The proportions of the two colors in a blend can be controlled by stylus pressure, number of overstrokes and/or stylus dwell time.

26 Claims, 5 Drawing Figures

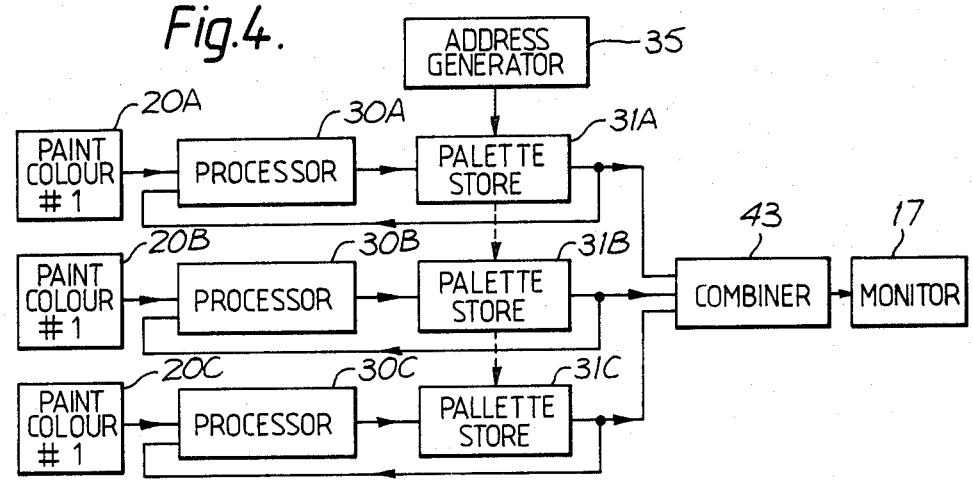
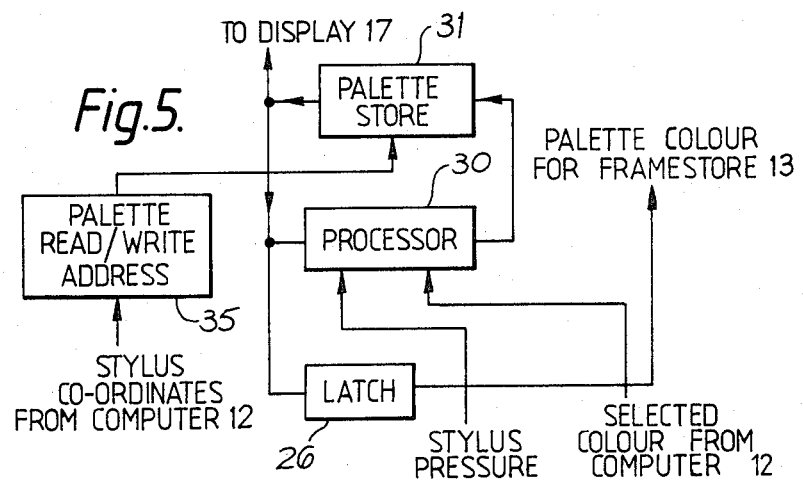

4,524,421

COMPUTERIZED GRAPHICS SYSTEM AND METHOD USING AN ELECTRONICALLY SYNTHESIZED PALETTE

BACKGROUND OF THE INVENTION

The invention relates to image creation systems and more specifically to color information synthesis suitable for use in such systems.

There are a number of standard computer peripherals available that permit "computer graphics" to be generated entirely electronically. These can take the form of vector or raster displays with the input device usually in the form of a touch tablet on which the operator can draw and see the results of this work in real time on the electronic display.

A typical known electronic graphics system is shown in FIG. 1, the main components comprising a touch tablet 10, a computer 12, a frame store 13 and a display 17. An artist draws with the stylus 11 of the touch tablet and the computer 12 registers the coordinates of the stylus whilst remembering the selected color from selector 18 with which the artist has chosen to draw. The computer then feeds the appropriate addresses to the frame store 13 where the pixel at that address is modified to hold the code (typically 8 bits) corresponding to the chosen color which it receives as incoming data. As the frame store is read at normal broadcast video rates under the control of the display address generator 15 typically locked to an external synchronizing reference if available, then the lines, or pictures, drawn by the artist become visible on the display. The monitor 17 is shown receiving the picture data converted into analogue form via DAC 14. It is found in practice that, providing the display is near to the touch tablet, the fact that the artist is not watching his hand but the screen provides no problem.

It is possible to use the computer to designate the stylus size via selector 19 so as to be several picture points in diameter for example so that the lines on the 'drawn' image will be of a designated width, as though drawn with a larger stylus. This is achieved by controlling the writing of data into the frame store so that adjacent picture points receive the incoming data also.

Although the system shows a single frame store 13 for ease of understanding, in practice the color information from computer 12 would typically be passed to three separate frame stores each handling respectively the luminance and color difference components of the color information (Y,I and Q for NTSC) and their outputs would be recombined to produce the normal color information displayed on monitor 17 using standard video techniques. Alternative systems using a single frame store are known where 'partial color' is handled in the form of the Red, Green and Blue components of the color information. Although the color is shown simply as being selected by selector 18, alternatively the operator, when he desires to chose a color, can call up an array of cells onto the monitor screen equivalent to a number of 'paint pots' and by moving the stylus over the touch tablet area can view the corresponding stylus position on the screen (as the computer typically generates a cross-wire or other screen cursor identifying the stylus position). When the stylus is located over the desired 'paint pot', the tablet is actually touched which then ensures that this is the color selected by the computer for output to screen via the frame store as the stylus draws the desired image.

A problem with such systems especially where greater realism and more color variations are desired is that the system must be designed to have a large number of such 'paint pots' available to the operator. Even then, the operator may find that the selection available is still not adequate for his needs.

The present invention is directed to an arrangement which allows the operator to produce any of a large variety of colors without the need to have unwieldy numbers of paint pots or other color selector mechanisms.

The term 'color' is used throughout the patent specification to encompass not only different colors but different hues of the same color as well as different shades of grey in the monochrome medium.

SUMMARY OF THE INVENTION

According to the invention there is provided a synthesised palette comprising color source means for defining at least two colors, selector means for selecting colors from the color source means, processing means for mixing the selected colors in desired proportions, control means for manually controlling the desired proportions of the color mix, monitor means for visually monitoring the mixing of the at least two colors, and holding means for retaining the mixed color for use thereafter.

BRIEF DESCRIPTION OF THE DRAWINGS

The invention will now be described by way of example with reference to the accompanying drawings, in which:

FIG. 4 shows color processing in the form of three component paths operating simultaneously, and FIG. 5 shows a palette arrangement suitable for incorporating into the FIG. 1 system.

DESCRIPTION OF PREFERRED EMBODIMENTS

Figure 2:
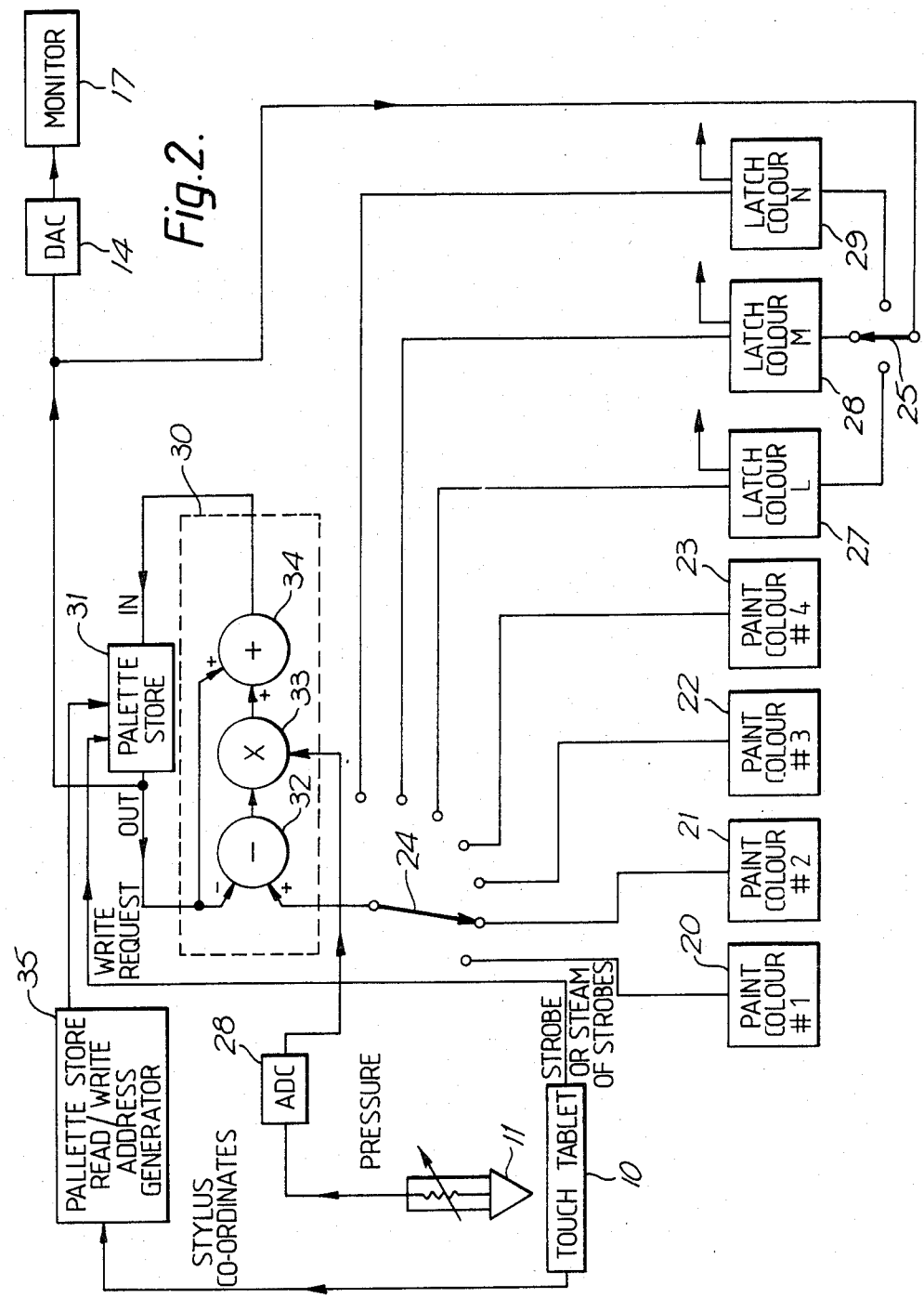
FIG. 2 shows an embodiment of the synchronized palette of the present invention.

An embodiment of the synthesised palette of the present invention is shown in FIG. 2. In this embodiment the palette will be operating in the digital domain.

The palette system includes a number of 'paint' colors from color sources 20–23. Typically each of these sources can comprise a digital thumbwheel switch producing a digital output indicative of the color allocated thereto. Each switch typically will have more than one position so as to provide a selection of colors. One of the appropriate colors can be accessed via rotary switch 24 and the digital number is passed to processor 30 consisting in this arrangement of a subtractor 32, multiplier 33 and adder 34. The processed output is made available to one or more of the locations within palette store 31 under the control of palette store address generator 35. The addresses are designated by the stylus 11 contacting the touch tablet 10 as in the FIG. 1 arrangement, although the palette store need not be as large as the frame store and thus the pixel addressing requirements can be reduced.

The touch tablet provides a strobe everytime the pen is moved and this is used to initiate a palette store write cycle.

Typically the palette size can be 256×128 pixels thus giving a 1/16th screen size palette area when displayed on the monitor. The color mix provided by processor 30 at any point within the palette as monitored via store 31 can be retained for future use when actually 'painting' by passing the digital equivalent to latch 27, 28 or 29 via switch 25, the relevant pixel location being chosen by placing of the stylus 11 on the appropriate location on the touch tablet 10 whereby that palette address can be accessed.

Figure 3:
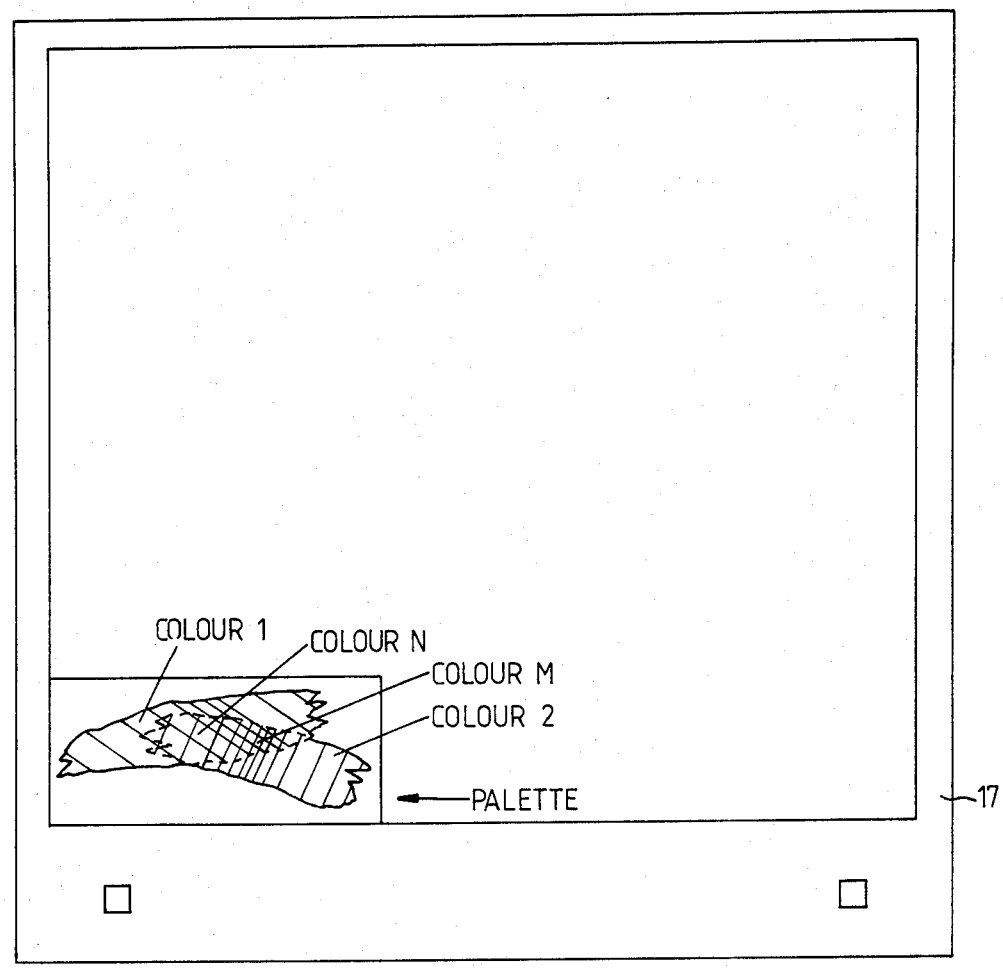
FIG. 3 shows the palette display with a mix of colors thereon.

In practice stylus 11 is typically fabricated to include a pressure sensitive device (e.g. spring loaded potentiometer) so that the pressure applied produces a voltage which after conversion in ADC 28 is used to manipulate the processing within processor 30 so as to simulate more closely the mixing effect associated with paint mixing on a normal palette and as illustrated in FIG. 3. More than one color from the blend may be retained in the spare latches. Thus a typical operation of the palette system would commence with selecting color 1 say and entering this onto the palette, that is via processor 30 into store 31. As no other color will be present in store 31 at this stage the color stored will be dependent on the stylus pressure alone. On selecting color 2 as shown in FIG. 2, this color is processed with the stored color so as to blend in those portions where the two colors overlap. This mix will also depend on the stylus pressure and how many overstrokes of the stylus have been made by the operator. When a particular color or range of colors have been satisfactorily produced then each of these (e.g. color M and N of FIG. 3) can be retained in the appropriate latches for further use either for painting or for blending with other colors via switch 24. This technique allows a whole range of colors to be generated at will from a few basic colors. Although only three latches are shown for simplicity this number can be increased. Thus when an operator is working on faces for example a range of flesh tones can be built up and retained for use on that particular subject. Where another picture is concerned with sky rendering then a range of blues can be used.

Although the system has been described as simulating the normal paint mixing process it could be modified so that the touch tablet produces a steady stream of strobes so that the mixing effect takes into account the time period for which the stylus is held at a given location.

Figure 1:
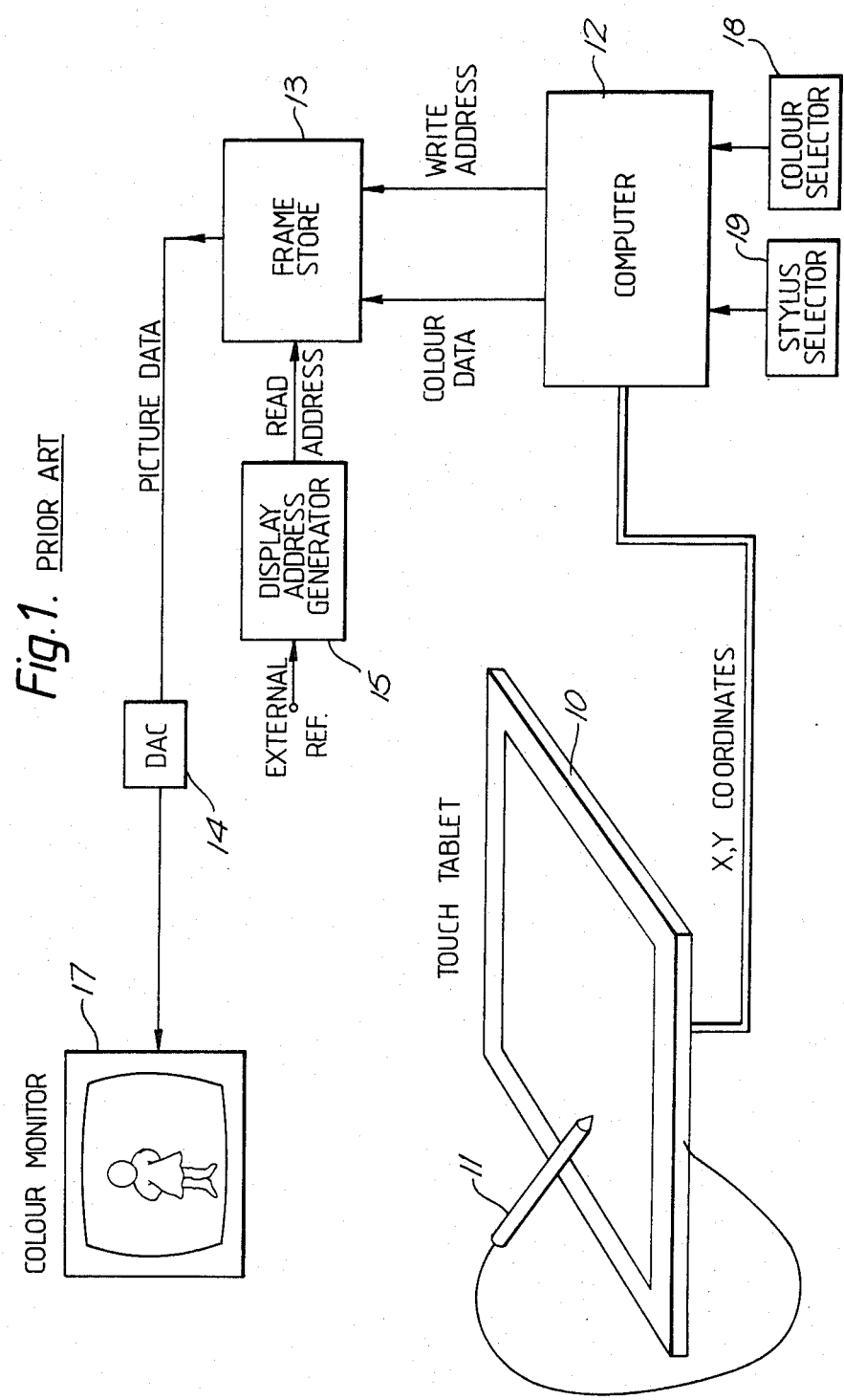
FIG. 1 shows a known graphics system under manual control.

Although the paint color processing has been illustrated in terms of a single processor 30 and palette store 31 for simplicity of understanding (and which would be perfectly adequate for monochrome pictures where the colors produced were all shades of grey), in practice the color information will typically be handled in three identical paths. Thus as shown in FIG. 4 the paint color from blocks 20A, 20B, 20C, which respectively hold the color components (e.g. Y, I and Q) will be output to respective processors and palette stores 30A–30C, 31A–31C driven in parallel from common address generator 35. The respective outputs will pass to combiner 43 where full color will be provided for monitoring (via a digital to analogue converter as necessary) or can be fed back to holding latches.

Where the palette system of the invention is incorporated into an existing graphics arrangement of the type shown in FIG. 1 then the present system can be represented by the FIG. 5 arrangement. A selected color made available via the computer can be mixed with a color already present in the palette and after mixing the color of interest can be retained in latch 26 for use in the frame store.

Although not shown it may be convenient to blank the monitor screen for that area outside the palette area, using standard techniques, or to key the palette area over the picture being painted.

Although the palette system of the invention is suitable for basic graphics generators, the flexibility and capability of the palette makes it ideal for more sophisticated systems such as that described in co-pending U.S. patent application Ser. No. 326,293, filed Dec. 1, 1981. The U.S. application is based on U.K. patent application Nos. 8038887and 8136539.

We claim:

1. A computerized graphics system comprising:
   a video screen;
   synthesized palette means for generating computer signals defining at least two source colors;
   selector means for selecting color-defining signals from the palette means;
   processing means for mixing the color-defining signals to generate a blend signal defining the color of a blend of the selected source colors and for causing the video screen to display the blend color; and
   means for storing the blend signal in the palette means for future use as a source color.

2. A system as in claim 1 in which the selector means include means responsive to operator input to generate a signal defining the respective proportions in the blend of the signals defining the selected source colors, and the processing means include means responsive to the proportions-defining signal to generate the blend signal on the basis of the defined proportions of the source signals.

3. A system as in claim 2 in which the means responsive to operator input to generate the proportions-defining signal comprise a stylus responding to the manner in which an operator manipulates it.

4. A system as in claim 4 including means responsive to operator input to determine the proportions of the source colors used to form the blend color.

5. A system as in claim 4 in which the selector means include a stylus and a touch tablet, and the operator input comprises the degree to which the stylus is pressed against the tablet.

6. A system as in claim 5 in which the operator input comprises the number of strokes of the stylus over a selected area of the tablet.

7. A system as in claim 6 in which the operator input comprises the dwell time of the stylus over a selected area of the tablet.

8. A system as in claim 1 in which the palette means include means for generating color-defining signals each comprising the color components needed to generate the selected color in a selected color video standard.

9. A computerized graphics system comprising:
   a video screen;
   synthesized palette means for generating computer signals defining at least two source colors;
   selector means for selecting color-defining signals from the palette means; and
   processing means for mixing the color-defining signals to generate a blend signal defining the color of a blend of the selected source colors and for causing the video screen to display the blend color.

10. A system as in claim 9 including means for selectively storing the signal defining the blend color in the palette means for future use as a source color.

11. A system as in claim 9 including means for displaying the source colors on the screen.

12. A system as in claim 11 in which the video screen includes a color mixing area and at least one of the source colors is displayed at the color mixing area.

13. A system as in claim 12 in which the blend color is displayed at the mixing area and replaces the display at that area of the source color used in the blend.

14. A system as in claim 9 including means responsive to operator input to determine the proportions of the source colors used to form the blend color.

15. A system as in claim 14 in which the selector means include a stylus and the operator input comprises pressure applied to the stylus.

16. A system as in claim 14 in which the selector means comprise a stylus and the operator input comprises the number of strokes of the stylus over a selected area.

17. A system as in claim 14 in which the selector means comprise a stylus and the operator input comprises the dwell time of the stylus over a selected area.

18. A system as in claim 14 in which the palette means include means for generating color-defining signals each comprising the color components needed to generate the selected color in a selected color video standard.

19. A computerized graphics system comprising:
a video screen;
means for causing the screen to display a selection of source colors at respective source color locations and to display a second selected color at a mixing location; and
means for designating a selected source color location and at least a selected portion of the mixing location and for generating respective designation signals and for causing the selected portion of the mixing location to display a blend of the selected source color and of the second color.

20. A system as in claim 19 in which the designating means include means responsive to operator input to include, in the designation signals, signal components indicative of the relative proportions of the selected source color and of the second color in the blend.

21. A graphics system comprising:
a screen having a mixing location which displays an existing color;
means for causing the screen to display a first, selected source color;
means for designating the first source color and at least a selected portion of the mixing location and for generating respective output signals defining selected characteristics of said first color and of said selected portion of the mixing location; and
means responsive to said output signals for causing the designated portion of the mixing location to display a color which is a blend of the first color and the existing color.

22. A system as in claim 21 including means for causing the screen to display the blend color as a second source color available for subsequent designation and blending.

23. A system as in claim 21 including means responsive to operator input to cause the displayed blend to be a blend of the selected source color and existing color in selected proportions.

24. A computer graphics method comprising the steps of:
displaying a selected source color at a selected location on a video screen and an existing color at a mixing location on the screen;
designating the selected location and at least a selected portion of the mixing area;
causing programmed computer means to generate signals indicative of said designating and to combine said signals into a blend signal defining a blend of the selected source color and the existing color;
causing the video screen to display the color defined by the blend signal; and
storing the blend signal for future use of the color defined thereby in the same manner as the source color.

25. A method as in claim 24 including causing the computer means to include in the designating signals components indicative of the desired proportions of the source color and the existing color and to utilize said components in said combining.

26. A system comprising:
(a) a video signal monitor having a display screen;
(b) a palette store having a plurality of storage locations corresponding to picture points on the palette area on said screen;
(c) means for causing signals from said storage locations in the palette store to be reproduced at the corresponding picture points in the palette area of the screen;
(d) a source of a plurality of color video signals representing different colors;
(e) means for selecting a color video signal from said source;
(f) operator means responsive to operator input to designate selected picture points in said palette area;
(g) means responsive to the designation of a picture point by the operator means for reading a signal stored in said palette store at a location corresponding to the designated picture point;
(h) processor means for blending the signal read from the palette store with a selected color video signal to generate a blended video signal;
(i) means for storing said blended color video signal in said palette store;
(j) means for reading the blended color signal from the palette store and for selectively storing it in further storage.

* * * * *

UNITED STATES PATENT AND TRADEMARK OFFICE
CERTIFICATE OF CORRECTION

PATENT NO. : 4,524,421

DATED : June 18, 1985

INVENTOR(S) : Anthony A. Searby and Ian C. Walker

It is certified that error appears in the above-identified patent and that said Letters Patent is hereby corrected as shown below:

Column 4, Line 42, delete "claim 4" and insert --claim 1--

Signed and Sealed this

Thirteenth Day of May, 1997

Attest:

BRUCE LEHMAN

Attesting Officer

Commissioner of Patents and Trademarks